(12) United States Patent
Costlow

(10) Patent No.: US 10,507,694 B2
(45) Date of Patent: *Dec. 17, 2019

(54) FLANGED TIRE AND WHEEL ASSEMBLY

(71) Applicant: Bridgestone Americas Tire Operations, LLC, Nashville, TN (US)

(72) Inventor: Douglas B. Costlow, Akron, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 0 days.

This patent is subject to a terminal disclaimer.

(21) Appl. No.: 16/023,491

(22) Filed: Jun. 29, 2018

(65) Prior Publication Data

US 2018/0304688 A1 Oct. 25, 2018

Related U.S. Application Data

(63) Continuation of application No. 15/538,803, filed as application No. PCT/US2015/056867 on Oct. 22, 2015, now Pat. No. 10,035,378.

(60) Provisional application No. 62/095,456, filed on Dec. 22, 2014.

(51) Int. Cl.
*B60C 7/26* (2006.01)
*B60C 7/24* (2006.01)
*B60C 7/10* (2006.01)
*B60C 7/14* (2006.01)

(52) U.S. Cl.
CPC ............ *B60C 7/26* (2013.01); *B60C 7/102* (2013.01); *B60C 7/24* (2013.01); *B60C 2007/146* (2013.01)

(58) Field of Classification Search
CPC .. B60C 7/24; B60C 7/26; B60C 7/102; B60C 2007/146
See application file for complete search history.

(56) References Cited

U.S. PATENT DOCUMENTS

| | | | |
|---|---|---|---|
| 848,745 A | 4/1907 | Hopkinson | |
| 920,523 A | 5/1909 | Beckers | |
| 4,226,273 A | 7/1980 | Long et al. | |
| 4,463,683 A * | 8/1984 | Uttscheid | B60B 17/02 104/94 |

(Continued)

FOREIGN PATENT DOCUMENTS

| | | |
|---|---|---|
| JP | 2010-234865 | 10/2010 |
| JP | 2011-201484 | 10/2011 |

OTHER PUBLICATIONS

Bae, Guen Tae; International Search Report and Written Opinion of PCT Application No. PCT/US2015/056867; dated Jan. 27, 2016; Korean Intellectual Property Office; Daejeon, Republic of Korea.

(Continued)

*Primary Examiner* — Kip T Kotter
(74) *Attorney, Agent, or Firm* — Shaun J. Fox; Bryan Jaketic

(57) ABSTRACT

A non-pneumatic tire includes a circumferential tread having a first axial width. The tire further includes a lower annular band having a circumferential convex curved surface and a second axial width greater than the first axial width. The lower annular band is configured to deflect upon application of an axial force above a threshold axial force. The tire also includes tire structure connecting the circumferential tread to the lower annular band. The tire structure has a third axial width less than the second axial width.

20 Claims, 4 Drawing Sheets

(56) References Cited

U.S. PATENT DOCUMENTS

| | | | |
|---|---|---|---|
| 4,832,098 | A | 5/1989 | Palinkas |
| 4,921,029 | A | 5/1990 | Palinkas |
| 6,303,060 | B1 | 10/2001 | Lobo |
| 6,845,796 | B2 | 1/2005 | Katoh et al. |
| 2011/0290394 | A1 | 12/2011 | Luchini et al. |
| 2013/0048174 | A1* | 2/2013 | Cron .................. B60C 7/10 152/324 |
| 2016/0243890 | A1 | 8/2016 | Nishida |

OTHER PUBLICATIONS

Ozdemir, Anil; Search Report and Written Opinion of corresponding European Application No. 15873891; dated Jun. 8, 2018.

* cited by examiner

FLANGED TIRE AND WHEEL ASSEMBLY

CROSS-REFERENCE TO RELATED APPLICATIONS

This application is a continuation of U.S. patent application Ser. No. 15/538,803, which was filed on Jun. 22, 2017 as a national stage of PCT/US2015/056867, and subsequently issued as U.S. Pat. No. 10,035,378 on Jul. 31, 2018. The PCT was filed on Oct. 22, 2015 and claims the benefit of U.S. Provisional Patent Application No. 62/095,456, filed on Dec. 22, 2014. The disclosure of each of these references is incorporated by reference herein in their entirety.

FIELD OF INVENTION

The present disclosure relates to a tire and wheel assembly. More particularly, the present disclosure relates to a non-pneumatic tire having a curved surface that interfaces with a curved surface of a flanged wheel.

BACKGROUND

Non-pneumatic tire constructions enable a tire to run in an uninflated condition. Some non-pneumatic tires employ a unitary tire and wheel construction. Other non-pneumatic tires are fastened to wheels using fasteners such as bolts. Non-pneumatic tires may include spokes that buckle or deflect upon contact with the ground. Such spokes may be constructed of a material that is relatively stronger in tension than in compression, so that when the lower spokes buckle, the load can be distributed through the remaining portion of the wheel.

SUMMARY OF THE INVENTION

In one embodiment, a non-pneumatic tire is configured to be received by a wheel having a circumferential concave surface. The non-pneumatic tire includes an upper annular band having a first axial width and a lower annular band having a second axial width greater than the first axial width. The lower annular band has a circumferential convex curve configured to be received by the circumferential concave surface of the wheel. The lower annular band is configured to deflect when an axial force above a threshold axial force is applied. The non-pneumatic tire also includes tire structure connecting the upper annular band to the lower annular band. The tire structure has a third axial width less than the second axial width.

In another embodiment, a non-pneumatic tire includes a circumferential tread having a first axial width. The tire further includes a lower annular band having a circumferential convex curved surface and a second axial width greater than the first axial width. The lower annular band is configured to deflect upon application of an axial force above a threshold axial force. The tire also includes tire structure connecting the circumferential tread to the lower annular band. Wherein the tire structure has a third axial width less than the second axial width.

In yet another embodiment, a non-pneumatic tire includes an upper annular band and a lower annular band having a circumferential convex surface. The lower annular band has a first axial width when the non-pneumatic tire is in an unmounted condition, and a second axial width less than the first axial width when the non-pneumatic tire is in a mounted condition. The tire further includes tire structure connecting the upper annular band to the lower annular band. At least a portion of the tire structure has an axial width less than the first axial width of the lower annular band.

BRIEF DESCRIPTION OF DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples or forms of components that fall within the scope of a term and that may be used for implementation. The examples are not intended to be limiting. Both singular and plural forms of terms may be within the definitions.

"Axial" or "axially" refer to a direction that is parallel to the axis of rotation of a tire.

"Circumferential" and "circumferentially" refer to a direction extending along the perimeter of the surface of the tread perpendicular to the axial direction.

"Equatorial plane" refers to the plane that is perpendicular to the tire's axis of rotation and passes through the center of the tire's tread.

"Radial" and "radially" refer to a direction perpendicular to the axis of rotation of a tire.

"Sidewall" refers to that portion of the tire below the tread and defining a side of the tire.

"Tread" refers to that portion of the tire that comes into contact with a road or other rolling surface under normal load.

Directions are stated herein with reference to the axis of rotation of the tire. The terms "upward" and "upwardly" refer to a general direction towards the tread of the tire, whereas "downward" and "downwardly" refer to the general direction towards the axis of rotation of the tire. Thus, when relative directional terms such as "upper" and "lower" or "top" and "bottom" are used in connection with an element, the "upper" or "top" element is spaced closer to the tread than the "lower" or "bottom" element. Additionally, when relative directional terms such as "above" or "below" are used in connection with an element, an element that is "above" another element is closer to the tread than the other element.

The terms "inward" and "inwardly" refer to a general direction towards the equatorial plane of the tire, whereas "outward" and "outwardly" refer to a general direction away from the equatorial plane of the tire and towards the sidewall of the tire. Thus, when relative directional terms such as "inner" and "outer" are used in connection with an element, the "inner" element is spaced closer to the equatorial plane of the tire than the "outer" element.

Figure 1:
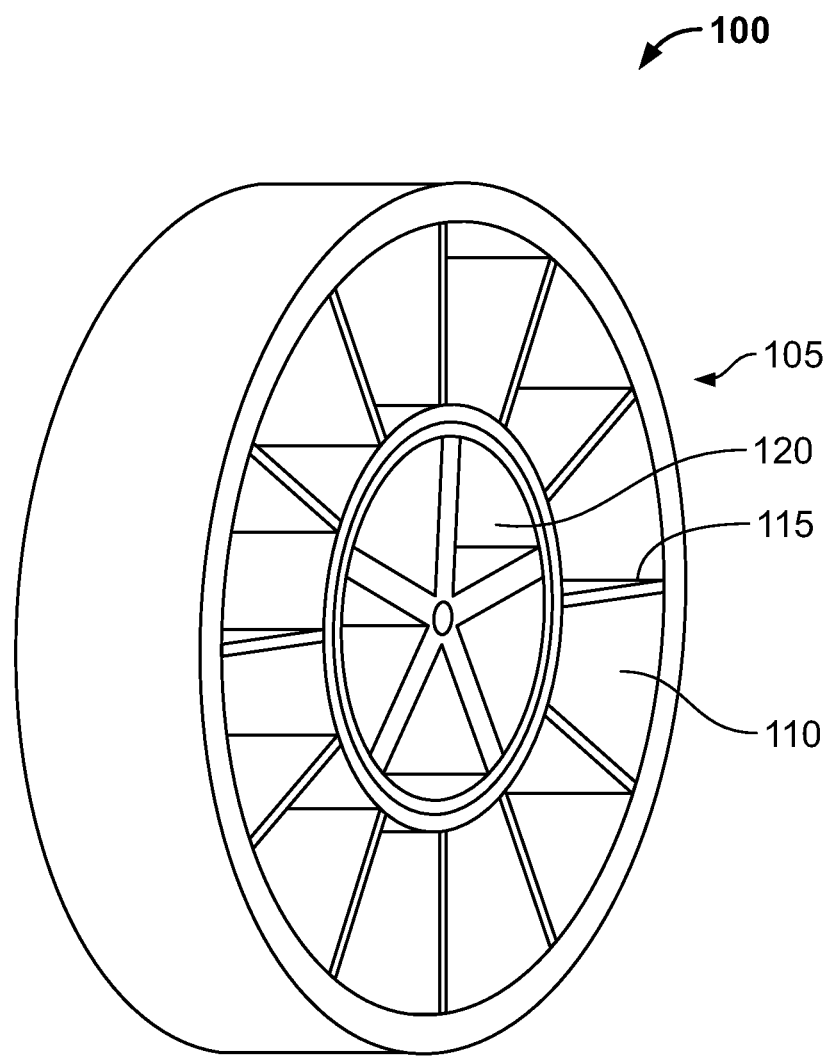
FIG. 1 is a perspective view of one embodiment of a non-pneumatic tire and wheel assembly.

FIG. 1 is a schematic drawing of a perspective view of one embodiment of a non-pneumatic tire and wheel assembly 100. The assembly 100 includes a non-pneumatic tire 105. In the illustrated embodiment, the non-pneumatic tire includes a plurality of openings 110 that define a plurality of spokes 115. In an alternative embodiment (not shown), the non-pneumatic tire includes a webbing. In another alternative embodiment (not shown), the non-pneumatic tire is a solid tire.

The assembly 100 further includes a wheel 120. The tire 105 and wheel 120 are not a unitary component. Instead, the tire 105 is removeably mounted on the wheel 120, so that the tire 105 may be dismounted for maintenance or replacement.

In one embodiment, the tire 105 and wheel 120 are constructed of different materials. For example, the wheel may be constructed of metal, such as steel, magnesium, aluminum, or other metals. The tire may be constructed of a polymeric material, such as polyurethane, polyethylene, ethylene propylene diene monomer rubber, thermoplastic, thermoplastic elastomers, resins, other synthetic or natural rubber, or other polymers. Alternatively, various components of the tire may be constructed of different materials, including metal and polymeric material.

Figure 2:
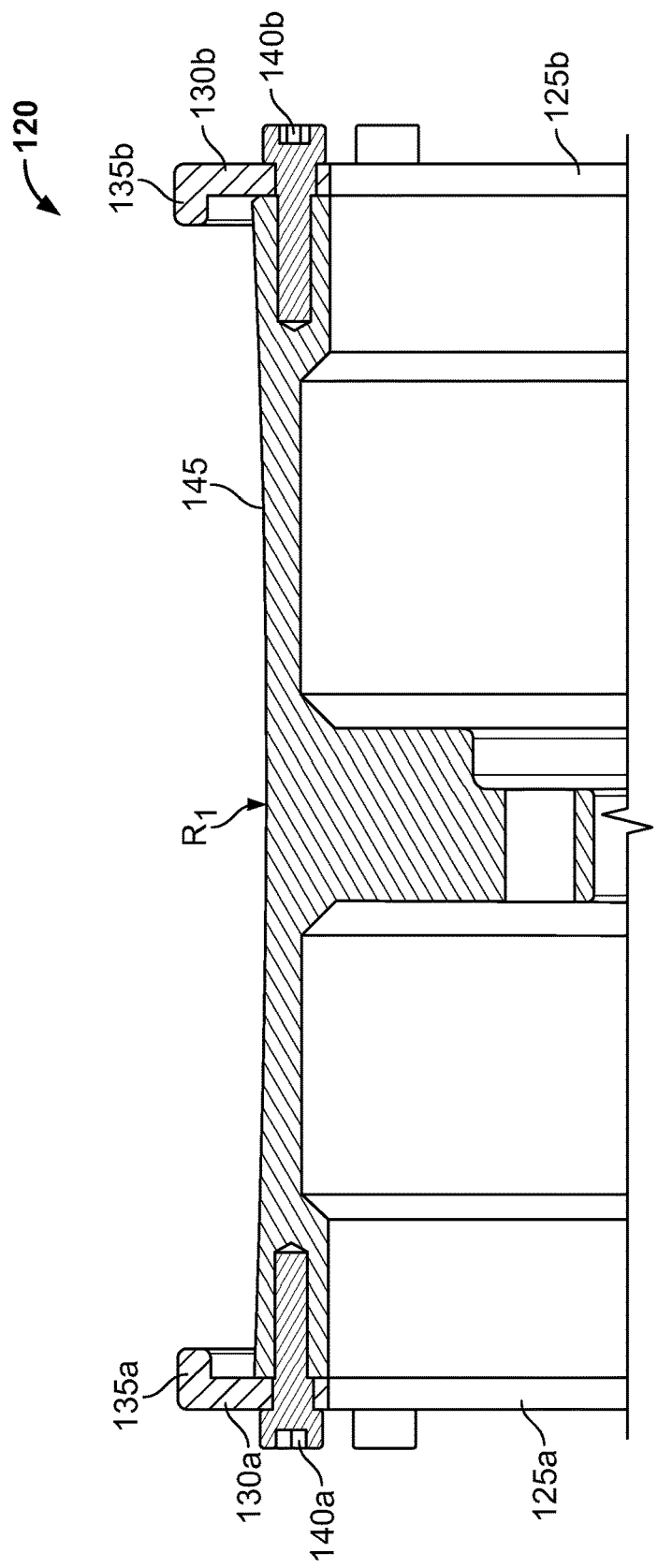
FIG. 2 is a partial cross-section of the wheel of the non-pneumatic tire and wheel assembly.

FIG. 2 illustrates a partial cross-section of the wheel 120. The wheel 120 includes a first side 125a having a first flange 130a, and a second side 125b having a second flange 130b. The first flange 130a includes a first flange lip 135a. Likewise, the second flange 130b includes a second flange lip 135b.

In the illustrated embodiment, the first flange 130a is removeably attached to the wheel 120 and is secured in place by a first plurality of bolts 140a. Likewise, the second flange 130b is removeably attached to the wheel 120 and is secured in place by a second plurality of bolts 140b. In an alternative embodiment (not shown), other known fasteners such as screws or clamps may be employed to removeably attach the flanges to the wheel. In another alternative embodiment (not shown), at least one of the flanges is permanently affixed to the wheel. In such an embodiment, the flange may be permanently affixed to the wheel by rivets or other permanent fasteners, or by a welding or brazing process. The flange and wheel may also be formed as a unitary structure through a molding, curing, or additive manufacturing process.

A circumferential concave surface 145 extends between the first side 125a and the second side 125b. The circumferential concave surface 145 is defined by an arc of a circle having a first radius $R_1$. Alternatively, the circumferential concave surface may be defined by multiple radii.

Figure 3:
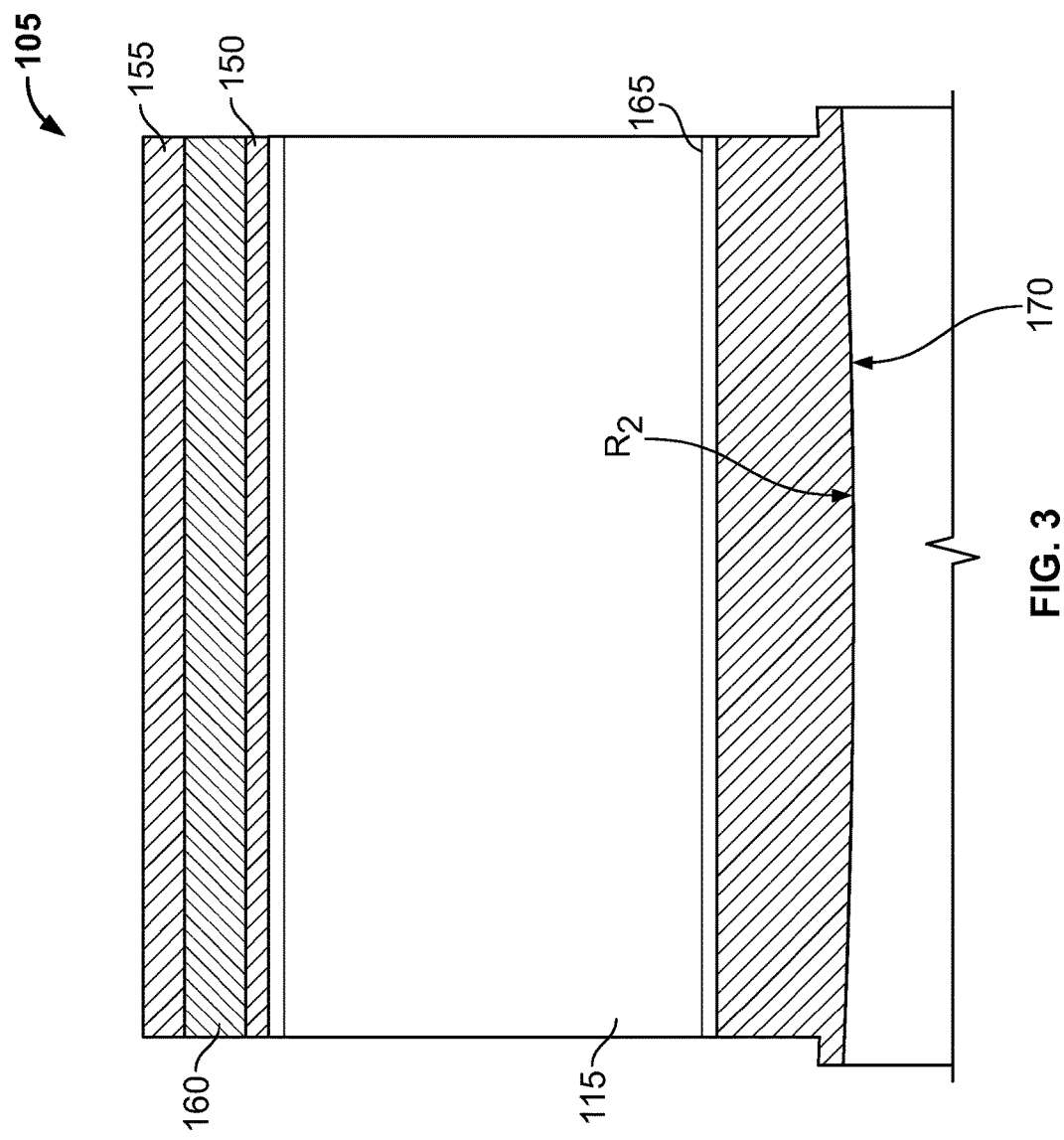
FIG. 3 is a partial cross-section of the non-pneumatic tire of the non-pneumatic tire and wheel assembly.

FIG. 3 illustrates a partial cross-section of the non-pneumatic tire 105. The tire 105 includes an upper annular band 150 that supports a tire tread 155. In the illustrated embodiment, the tire tread 155 includes reinforcement structure 160. The reinforcement structure may be one or more belts. In an alternative embodiment, the reinforcement structure is a high annular strength band that acts as a structural compression member on the tire, and increases interlaminar shear strength across the axial length of the tire. The reinforcement structure may include inelastic outer portions that sandwich an elastic center portion. Other examples of high annular strength bands are discussed in U.S. Pat. No. 5,879,484, which is incorporated by reference herein in its entirety. The high annular strength band may also be referred to as a "shear band" or "band."

In one embodiment, the upper annular band 150 is constructed of a polymer, such as polyurethane and the tread 155 is constructed of an elastomeric material, such as rubber. The reinforcement structure 160 may be constructed of metal, polymeric material, resin, fabric, fiber, a woven material, or a combination thereof. In an alternative embodiment, the reinforcement structure is omitted. In another alternative embodiment, the upper annular band is constructed of an elastomeric material and acts as a circumferential tread.

The tire 105 also includes a lower annular band 165 that has a circumferential convex surface 170. When the non-pneumatic tire 105 is in an unmounted condition as shown, the lower annular band 165 has an axial width greater than an axial width of the circumferential concave surface 145 of the wheel 120. In the illustrated embodiment, the axial width of the lower annular band 165 is also greater than an axial width of the upper annular band 150. In an alternative embodiment (not shown), the upper annular band has an equal or greater axial width than the lower annular band.

The circumferential convex surface 170 is defined by an arc of a circle having a second radius $R_2$ that is greater than the first radius $R_1$. Alternatively, the circumferential concave surface may be defined by multiple radii.

The spokes 115 connect the upper annular band 150 to the lower annular band 165. In the illustrated embodiment, the spokes 115 have an axial width less than the axial width of the lower annular band 165. In an alternative embodiment, only a lower portion of the spokes have an axial width less than the axial width of the lower annular band.

Figure 4:
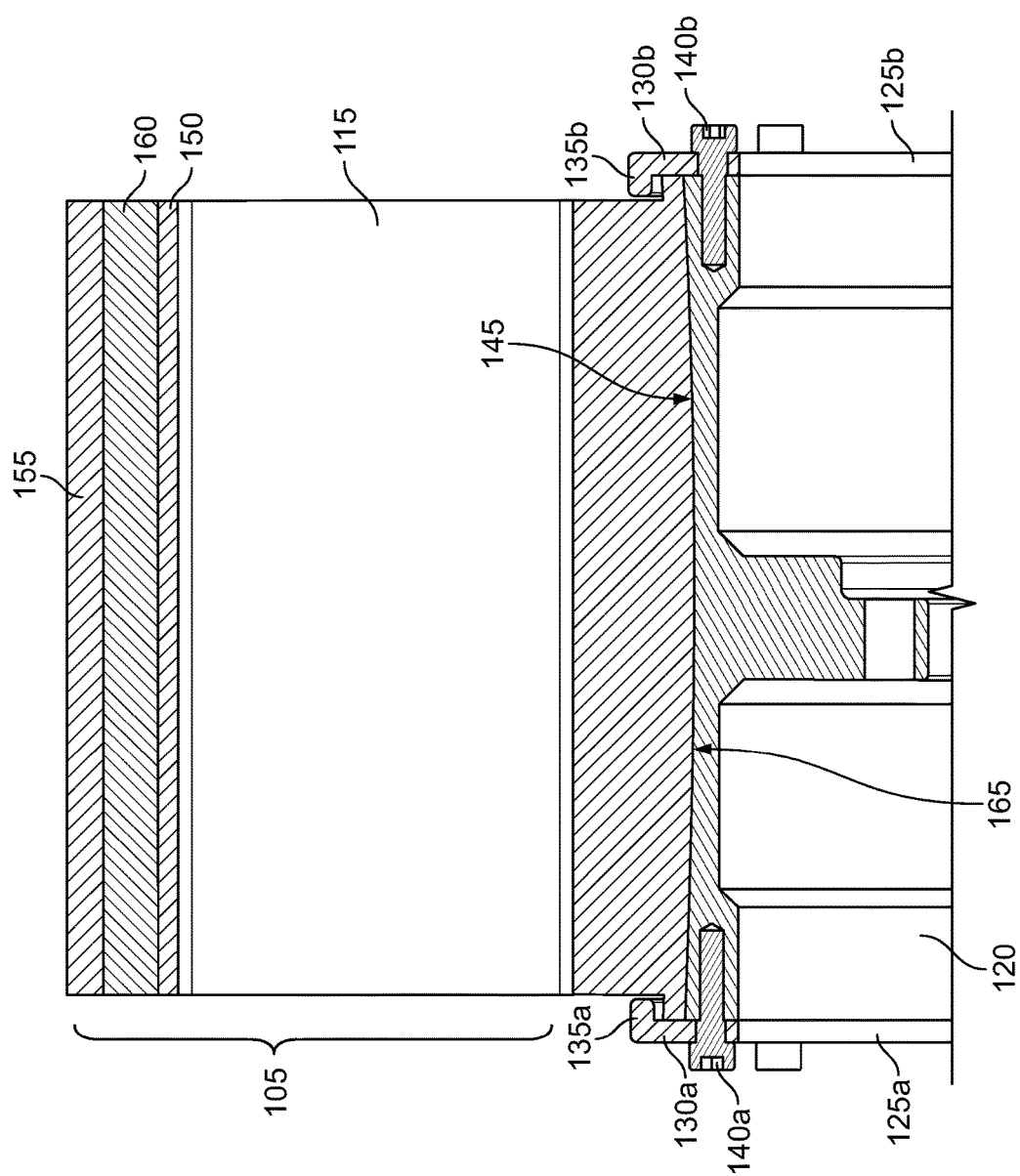
FIG. 4 is a partial cross-section of the non-pneumatic tire and wheel assembly.

FIG. 4 illustrates a partial cross-section of the tire and wheel assembly 100. The lower annular band 165 is disposed between the first flange 130a and the second flange 130b. The lower annular band 165 is dimensioned such that it is positioned below the first and second flange lips 135a,b.

Although the axial width of the lower annular band 165 is greater than the axial width of the concave circumferential surface 145 of the wheel 120 when the tire is in an unmounted condition, this changes when the tire 105 is mounted to the wheel 120. To mount the tire 105, at least one of the flanges 130a,b is first removed from the wheel 120. The tire 105 is then placed about the concave circumferential surface 145 of the wheel 120. Because the second radius $R_2$ of the circumferential convex surface of the lower annular band 165 is greater than the first radius $R_1$ of the concave circumferential surface 145, there initially is a gap between the two surfaces.

One or both of the flanges 130a,b are then attached to the wheel 120 by the bolts 140a,b. To secure the flanges 130a,b to the wheel 120, an axial force must be applied to the flanges 130a,b. This axial force is transferred from the flanges 130a,b to the lower annular band 165. When the axial force is above a minimum threshold, the axial force causes the lower annular band 165 to buckle, or otherwise deflect downward. In one embodiment, the minimum threshold force is between 10-100 pounds (40-400 Newtons). In an alternative embodiment, the minimum threshold force is between 10-50 pounds (40-200 Newtons). In another alternative embodiment, the minimum threshold force is between 20-60 pounds (80-240 Newtons).

The material of the lower annular band 165 and the dimensions of the convex circumferential surface of the lower annular band 165 and the concave circumferential surface 145 of the wheel 120 are selected such that when sufficient axial force is applied, the flanges 130a,b are fully attached to the wheel 120 and the buckling of the lower annular band 165 causes it to fully engage the concave circumferential surface 145 of the wheel 120.

Pressure between the lower annular band 165 and the concave circumferential surface 145 creates friction between the surfaces, which resists rotation of the lower annular band 165 relative to the wheel 120. The deflection of the lower annular band 165 also creates tension in the spokes 115 directed radially towards the center of the assembly. This tension works to counteract any forces developed in the non-pneumatic tire 105 directed radially outward from the center.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A non-pneumatic tire configured to be received by a wheel having a circumferential concave surface, the non-pneumatic tire comprising:
   an upper annular band having a first axial width;
   a lower annular band having a second axial width greater than the first axial width,
      wherein the lower annular band has a circumferential convex curve configured to be received by the circumferential concave surface of the wheel, and
      wherein the lower annular band is configured to deflect downward when an axial force above a threshold axial force is applied; and
   tire structure connecting the upper annular band to the lower annular band, wherein the tire structure has a third axial width less than the second axial width, wherein the downward deflection of the lower annular band creates tension in the tire structure.

2. The non-pneumatic tire of claim 1, wherein the threshold axial force is between 10 pounds and 100 pounds.

3. The non-pneumatic tire of claim 1, wherein the tire structure includes a plurality of spokes.

4. The non-pneumatic tire of claim 1, wherein the tire structure includes a webbing.

5. The non-pneumatic tire of claim 1, wherein the tire structure is a solid tire structure.

6. A non-pneumatic tire comprising:
   a circumferential tread having a first axial width;
   a lower annular band having a circumferential convex curved surface and a second axial width greater than the first axial width, wherein the lower annular band is configured to deflect downward upon application of an axial force above a threshold axial force; and
   tire structure connecting the circumferential tread to the lower annular band, wherein the tire structure has a third axial width less than the second axial width, wherein the downward deflection of the lower annular band creates tension in the tire structure.

7. The non-pneumatic tire of claim 6, further comprising an upper annular band, wherein the circumferential tread is connected to the upper annular band.

8. The non-pneumatic tire of claim 6, wherein the circumferential tread is an upper annular band.

9. The non-pneumatic tire of claim 6, wherein the circumferential convex curved surface is defined by an arc of a circle.

10. The non-pneumatic tire of claim 6, wherein the threshold axial force is between 10 pounds and 100 pounds.

11. The non-pneumatic tire of claim 6, wherein the threshold axial force is between 10 pounds and 50 pounds.

12. A non-pneumatic tire comprising:
   an upper annular band,
   a lower annular band having a circumferential convex surface, wherein the lower annular band has a first axial width when the non-pneumatic tire is in an unmounted condition, and a second axial width less than the first axial width when the non-pneumatic tire is in a mounted condition, and
   tire structure connecting the upper annular band to the lower annular band, wherein at least a portion of the tire structure has an axial width less than the first axial width of the lower annular band, wherein a changing of the axial width of the lower annular band from the first axial width to the second axial width creates tension in the tire structure.

13. The non-pneumatic tire of claim 12, further comprising a plurality of bolts configured to fasten the non-pneumatic tire to a wheel.

14. The non-pneumatic tire of claim 12, wherein the lower annular band is configured to deflect upon application of an axial force above a threshold axial force.

15. The non-pneumatic tire of claim 14, wherein the deflection of the lower annular band creates tension in the tire structure.

16. The non-pneumatic tire of claim 12, wherein at least a portion of the tire structure has an axial width less than the second axial width of the lower annular band.

17. The non-pneumatic tire of claim 12, wherein the tire structure includes a plurality of spokes.

18. The non-pneumatic tire of claim 12, wherein the tire structure includes a webbing.

19. The non-pneumatic tire of claim 12, wherein the tire structure is a solid tire structure.

20. The non-pneumatic tire of claim 12, wherein the circumferential convex surface is defined by an arc.

* * * * *